US012643567B2

(12) United States Patent
Choi et al.

(10) Patent No.: US 12,643,567 B2
(45) Date of Patent: Jun. 2, 2026

(54) METHOD AND APPARATUS FOR CONTROLLING VEHICLE BASED ON WEATHER INFORMATION AND ROAD ENVIRONMENT INFORMATION

(71) Applicants: Hyundai Motor Company, Seoul (KR); Kia Corporation, Seoul (KR)

(72) Inventors: Ji Hun Choi, Goyang-si (KR); Jun Yong Lee, Seongnam-si (KR); Sung Ho Kim, Hwaseong-si (KR); Sung Ik Jo, Hwaseong-si (KR); Sung Su Kim, Daegu (KR); Seung Eun Yu, Bucheon-si (KR); Sung Jae Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 127 days.

(21) Appl. No.: 18/655,724

(22) Filed: May 6, 2024

(65) Prior Publication Data

US 2025/0206334 A1 Jun. 26, 2025

(30) Foreign Application Priority Data

Dec. 22, 2023 (KR) ........................ 10-2023-0189910

(51) Int. Cl.
*B60W 60/00* (2020.01)
*B60W 30/16* (2020.01)
(52) U.S. Cl.
CPC ........ *B60W 60/001* (2020.02); *B60W 30/162* (2013.01); *B60W 2420/00* (2013.01); (Continued)
(58) Field of Classification Search
CPC ............. B60W 60/001; B60W 30/162; B60W 2420/00; B60W 2520/105; B60W 2520/26; B60W 2554/801; B60W 2555/20; B60W 2554/802; B60W 10/04; B60W 30/18172; B60W 2520/263; B60W 2720/10; B60W 2720/106; B60W 10/06; B60W 10/08; B60W 60/0018; B60W 40/06; B60W 40/10; B60W 2420/403; B60W 2420/408
See application file for complete search history.

(56) References Cited

U.S. PATENT DOCUMENTS

2011/0303000 A1* 12/2011 Engstrom ......... G01M 17/0074
73/116.06
2021/0370899 A1* 12/2021 Hwang .................... B60L 7/26
2022/0011116 A1* 1/2022 Panzer ................. G05D 1/0274

FOREIGN PATENT DOCUMENTS

CN 115520030 A * 12/2022 ............. B62K 23/04
KR 20120053899 A 5/2012

* cited by examiner

*Primary Examiner* — Long T Tran
*Assistant Examiner* — Charles J Brauch
(74) *Attorney, Agent, or Firm* — Slater Matsil, LLP

(57) ABSTRACT

A method and apparatus for controlling a vehicle based on weather information and road environment information can include obtaining weather information and wheel slip information on a road on which a vehicle is traveling, such as when a weather and road environment association mode is ON, determining a weather association factor based on the weather information, determining a wheel slip correction factor based on the wheel slip information, determining a driving torque factor based on the weather association factor and the wheel slip correction factor, and controlling a driving source of the vehicle based on the driving torque factor.

18 Claims, 11 Drawing Sheets

(52) U.S. Cl.
CPC ... *B60W 2520/105* (2013.01); *B60W 2520/26*
(2013.01); *B60W 2554/801* (2020.02); *B60W*
*2555/20* (2020.02)

210 communication unit (211)

Figure 2:
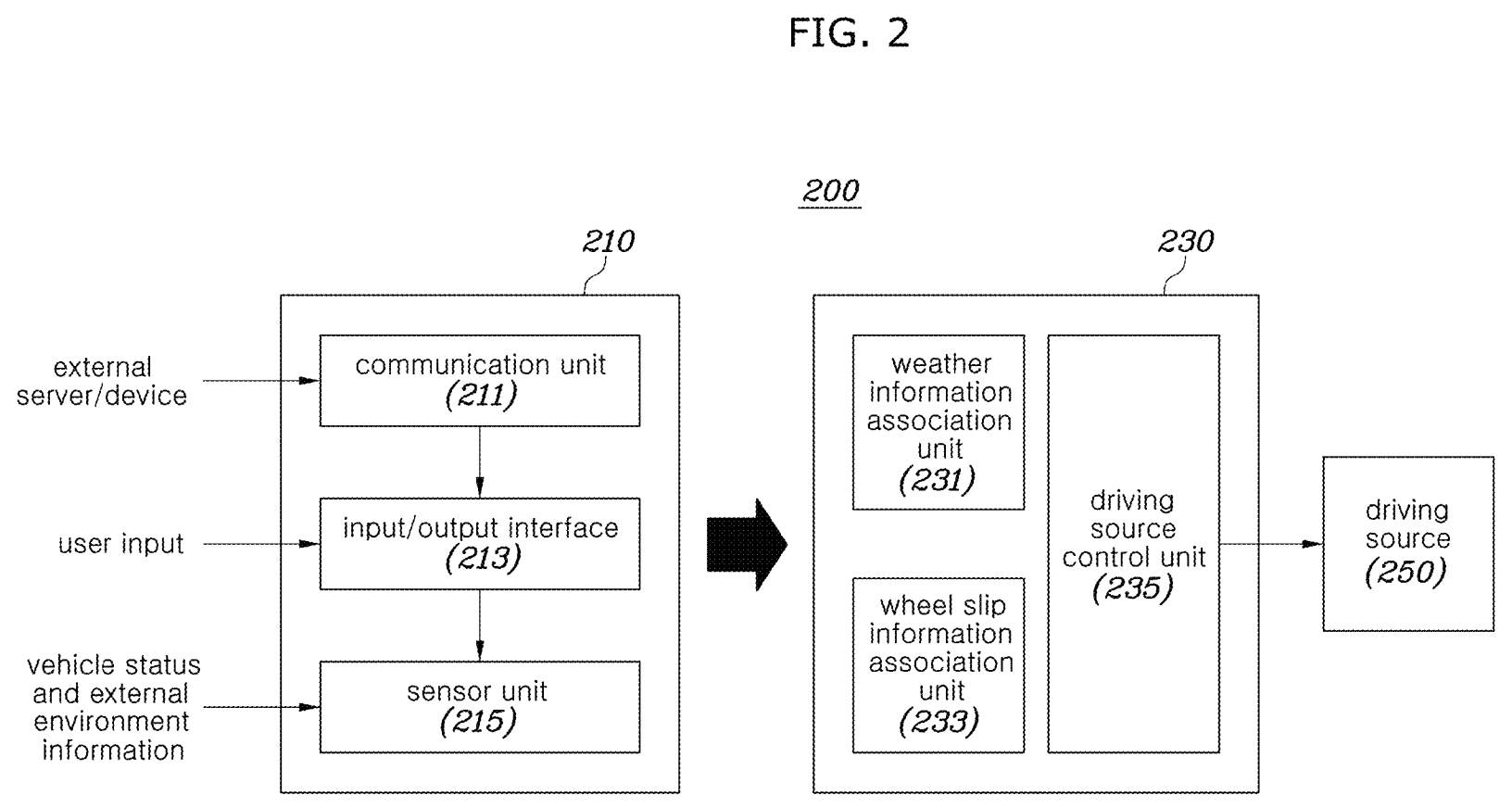

input/output interface (213)

sensor unit (215)

external server/device user input vehicle status and external environment information

230 weather information association unit (231)

wheel slip information association unit (233)

driving source control unit (235)

driving source (250)

driving convenience whether and road
environment association
used ☑     not used ☐ crouse mode sensitivity association
used ☑     not used ☐ smart regenerative braking
used ☑     not used ☐

• • • level 4      level 3      level 2      level 1 vehicle
speed wheel
slip

<snow/asphalt>

<rain/asphalt>

METHOD AND APPARATUS FOR CONTROLLING VEHICLE BASED ON WEATHER INFORMATION AND ROAD ENVIRONMENT INFORMATION

CROSS-REFERENCE TO RELATED APPLICATIONS

This application claims the benefit of Korean Patent Application No. 10-2023-0189910, filed on Dec. 22, 2023, which application is hereby incorporated herein by reference.

TECHNICAL FIELD

The present disclosure relates to autonomous driving technology.

BACKGROUND

As vehicle functions become more advanced, a smart cruise control (SCC) system and an electronic stability control (ESC) system that promote vehicle safety are being installed. The SCC system is a device for controlling a distance between vehicles during driving and provides a cruise function of detecting several kilometers ahead using a radar sensor attached to the front of a vehicle and controlling the vehicle to automatically travel at a speed set by a driver while maintaining a preset constant distance from a preceding vehicle or a speed limit function of controlling the vehicle speed such that it does not exceed a speed set by the driver.

Meteorological environments such as weather cause drivers difficulty while driving on roads. For example, when rain or snow is falling, vehicle braking distances increase, which may cause traffic accidents. To prevent such accidents, it is easy to see a message recommending reduction of the speed to 80% of the normal driving speed when driving on highways when there is a lot of rain or snow.

Recently, technologies have been developed to assist driving by providing information such as weather to drivers. However, conventional technologies have the disadvantage that only primary data received through communication with a server is used and thus the actual vehicle driving environment cannot be taken into account. Additionally, the conventional technologies have a problem that the actual road environment and weather environment are not reflected because the technologies rely on predicted information.

SUMMARY

The present disclosure relates to autonomous driving technology, and particularly, to a method and apparatus for controlling a vehicle based on weather information and road environment information.

An embodiment of the present disclosure can differentiate and supplement a required torque of autonomous driving cooperative control technology by considering not only a road environment received from a server but also an actual road environment determined by a vehicle.

An embodiment of the present disclosure can provide a vehicle control technology capable of minimizing the difference between an actual driver's vehicle driving environment and a road environment predicted depending on a driving environment and a weather environment.

In accordance with an embodiment of the present disclosure, the above and other advantages can be accomplished by the provision of a method of controlling a vehicle, including obtaining weather information and wheel slip information on a road on which the vehicle is traveling when a weather and road environment association mode is ON, determining a weather association factor based on the weather information, determining a correction factor according to wheel slip based on the wheel slip information, determining a driving torque factor based on the weather association factor and the correction factor according to wheel slip, and controlling a driving source of the vehicle based on the driving torque factor.

The weather information may be received from a weather server or detected by at least one sensor installed in the vehicle.

The wheel slip information may be determined based on a front wheel speed and a rear wheel speed.

The weather information may include at least one of whether rain or snow is falling, rainfall amount information, precipitation information, or a combination thereof.

The weather association factor may be determined based on the weather information, a target vehicle speed tracking torque, a rising limit, and a falling limit.

The rising limit may be determined to be a lower value as a difference between a current vehicle speed and vehicle speed increases of a target vehicle.

The falling limit can be determined to be a higher value as a braking distance or a distance to a preceding object decreases.

The factor according to wheel slip may be determined based on the target vehicle speed tracking torque, a wheel slip torque, a wheel slip rate, and steering angle compensation.

The driving torque factor may be determined by subtracting the correction factor according to wheel slip from a value obtained by multiplying the target vehicle speed tracking torque by the weather association factor.

The at least one sensor may be at least one of a camera, a radar, a light detecting and ranging device (LiDAR), a temperature sensor, a humidity sensor, or a combination thereof.

In accordance with an embodiment of the present disclosure, a system for controlling a vehicle can include an information acquisition unit configured to obtain weather information and wheel slip information on a road on which the vehicle is traveling when a weather and road environment association mode is ON, a controller configured to determine a weather association factor based on the weather information, to determine a correction factor according to wheel slip based on the wheel slip information, to determine a driving torque factor based on the weather association factor and the correction factor according to wheel slip, and to control a driving source of the vehicle based on the driving torque factor, and the driving source configured to move the vehicle forward or backward under the control of the controller.

The weather information may be received from a weather server or detected by at least one sensor installed in the vehicle.

The wheel slip information may be determined based on a front wheel speed and a rear wheel speed.

The weather information may include at least one of whether rain or snow is falling, rainfall amount information, precipitation information, or a combination thereof.

The weather association factor may be determined based on the weather information, a target vehicle speed tracking torque, a rising limit, and a falling limit.

The rising limit may be determined to be a lower value as a difference between a current vehicle speed and target vehicle speed increases.

The falling limit may be determined to be a higher value as a braking distance or a distance to a preceding object decreases.

The factor according to wheel slip may be determined based on the target vehicle speed tracking torque, a wheel slip torque, a wheel slip rate, and steering angle compensation.

The driving torque factor may be determined by subtracting the correction factor according to wheel slip from a value obtained by multiplying the target vehicle speed tracking torque by the weather association factor.

The at least one sensor may be at least one of a camera, a radar, a LiDAR, a temperature sensor, a humidity sensor, or a combination thereof.

BRIEF DESCRIPTION OF THE DRAWINGS

The above and other features and other advantages of the present disclosure can be more clearly understood from the following detailed description taken in conjunction with the accompanying drawings, in which:

FIG. 2 is a block diagram showing a structure of a vehicle control system according to an embodiment of the present disclosure;

DETAILED DESCRIPTION OF ILLUSTRATIVE EMBODIMENTS

Figure 1:
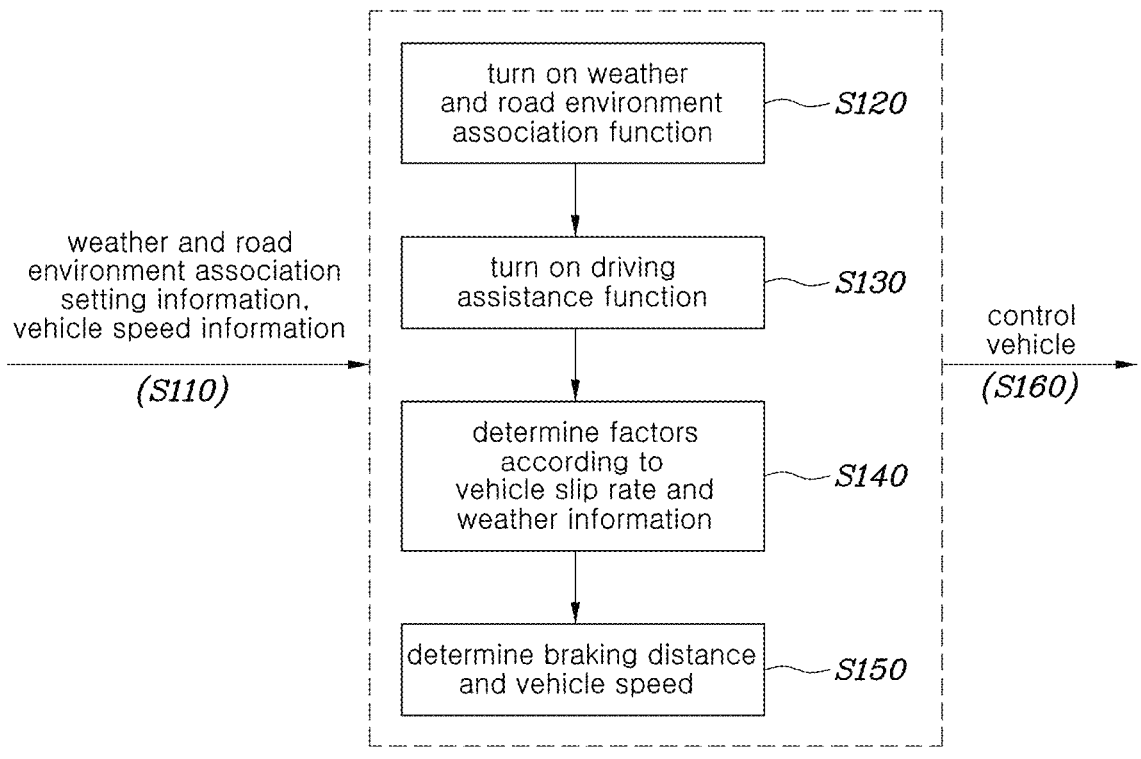
FIG. 1 is a flowchart showing a vehicle control method of a vehicle control system according to an embodiment of the present disclosure.

Hereinafter, some example embodiments disclosed in the present specification will be described in detail with reference to the attached drawings. Identical or similar components can be assigned the same reference numeral regardless of reference numerals, and redundant descriptions thereof can be omitted. The suffixes "module" and "unit" of elements herein can be used for convenience of description and thus can be used interchangeably and do not necessarily have any distinguishable meanings or functions. In the following description of some example embodiments disclosed in the present specification, a detailed description of known functions and configurations incorporated herein can be omitted when it may obscure the subject matter of the present disclosure. In addition, the accompanying drawings are provided only for ease of understanding of the example embodiments disclosed in the present specification, do not necessarily limit the technical spirit disclosed herein, and all changes, equivalents, and substitutes can be included in the spirit and scope of the present disclosure.

The terms "first" and/or "second" can be used to describe various components, but such components are not necessarily limited by such terms. Such terms can be used to discriminate one component from another component.

When a component is "coupled" or "connected" to another component, it can be understood that a third component may be present between the two components although the component may be directly coupled or connected to the other component. When a component is "directly coupled" or "directly connected" to another component, it can be understood that no element is present between the two components.

An element described in the singular form can be intended to include a plurality of elements unless the context clearly indicates otherwise.

In the present specification, it can be further understood that the term "comprise" or "include" specifies the presence of a stated feature, figure, step, operation, component, part, or combination thereof, but does not preclude the presence or addition of one or more other features, figures, steps, operations, components, or combinations thereof.

Some embodiments of the present disclosure can fulfill a demand for technology for controlling a vehicle by considering not only road environments received from a server but also actual road environments determined by the vehicle.

FIG. 1 is a flowchart showing a vehicle control method of a vehicle control system according to an embodiment of the present disclosure.

Referring to FIG. 1, the vehicle control system can obtain weather and road environment association setting information, weather information, and vehicle speed information (operation S110).

The weather and road environment association setting information may be obtained by receiving user input from a driver through an input/output interface installed in the driver's seat of a vehicle.

The input/output interface may be an audio/video/navigation (AVN) system.

The weather information may be received from a weather server or obtained by a camera, a light detecting and ranging device (LiDAR) sensor, or the like, installed in the vehicle.

Additionally, the vehicle control system can turn on a weather and road environment association function (operation S120).

In some embodiments, the vehicle control system can be implemented only when the weather and road environment association setting information obtained in operation Silo indicates turning on of the weather and road environment association function.

The vehicle control system can turn on a driving assistance function (operation S130).

The driving assistance function may be preset in a memory, a storage device, or the like, of the vehicle control system to be activated or deactivated.

The vehicle control system can determine factors according to a vehicle slip rate and weather information (operation S140).

The factors according to the vehicle slip rate and weather information may be determined based on weather information and vehicle speed information received in operation Silo.

The vehicle control system can determine a braking distance and a vehicle speed (operation S150).

The braking distance and the vehicle speed may be determined based on the factors according to the vehicle slip rate and weather information.

The vehicle control system can control the vehicle (operation S160).

Vehicle control may be performed based on the braking distance and the vehicle speed determined in operation S150.

Vehicle control may be performed by transmitting a command torque to a driving source of the vehicle.

The driving source of the vehicle may be an engine or a motor.

FIG. 2 is a block diagram showing a structure of a vehicle control system according to an embodiment of the present disclosure.

Referring to FIG. 2, a vehicle control system according to an embodiment can include an information acquisition unit 210, a controller 230, and a driving source 250, any combination of or all of which may be in plural or may include plural components thereof.

The information acquisition unit 210 can include a communication unit 211, an input/output interface 213, and a sensor unit 215, any combination of or all of which may be in plural or may include plural components thereof.

The communication unit 211 can receive weather information, information on the road on which the vehicle is traveling, and the like, from an external server or an external device.

The weather information may be received from a weather server, a weather information server, or user equipment (UE).

The input/output interface 213 can receive user input for turning on/off a weather and road environment association mode and/or a driving assistance mode.

The input/output interface 213 may transmit a query asking whether to turn on or off the weather and road environment association mode and/or the driving assistance mode and receive user input in response to the query.

The query asking whether to turn on or off the weather and road environment association mode and/or the driving assistance mode may be transmitted through audio or a display screen.

Figures 3, 4:
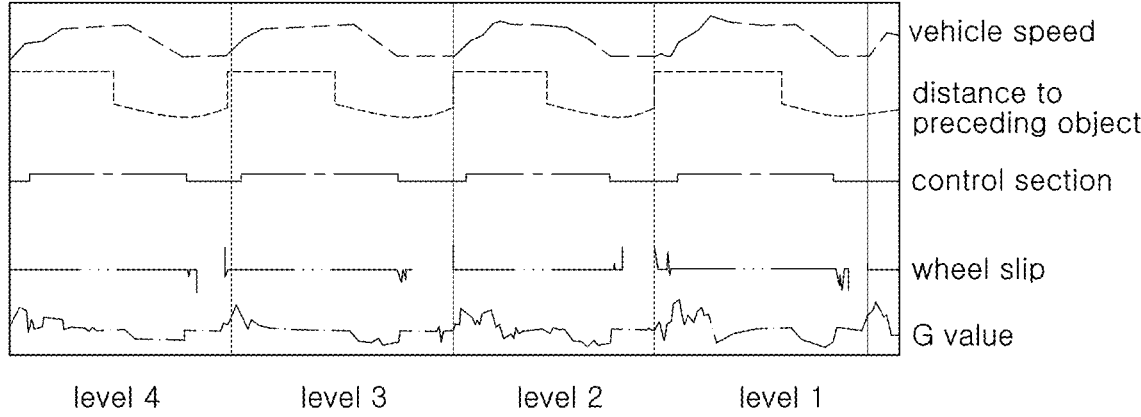
FIG. 3 is a diagram showing an example of a user setting menu (USM) screen that can be provided by an input/output interface according to an embodiment of the present disclosure.
FIG. 4 is a chart showing sensing information that can be measured in a vehicle when another vehicle is detected in front of the vehicle to which general autonomous driving assistance technology is applied, according to an embodiment of the present disclosure.

FIG. 3 shows an example of a user setting menu (USM) screen that can be provided by the input/output interface 213 of the present disclosure.

Referring to FIG. 3, the input/output interface 213 may provide a screen for receiving a check input for use or non-use of weather and road environment association on the user setting menu screen and receive user input regarding whether to turn on or off the weather and road environment association mode and/or the driving assistance mode when the user checks use or non-use of weather and road environment association through touch input or the like.

Referring back to FIG. 2, the sensor unit 215 can receive vehicle status and external environment information from at least one sensor provided inside or outside the vehicle.

The at least one sensor may be at least one of at least one camera, radar, LiDAR, temperature sensor, or humidity sensor provided inside or outside the vehicle, or a combination thereof.

For example, the sensor unit 215 may obtain weather information using at least one of an image captured by a camera, a temperature sensor, or a humidity sensor.

Additionally, the sensor unit 215 may obtain information on road surface conditions using a camera or the like.

The controller 230 can control the driving source 250 of the vehicle using information obtained by the information acquisition unit 210.

A weather information association unit 231 can receive weather information from the sensor unit 215 and can determine weather association factors for controlling the vehicle based on the weather information.

Referring to FIG. 4, in general autonomous driving assistance technology, sensitivity for vehicle braking when a preceding object is detected can be set to multiple levels, and a distance at which the vehicle speed starts to decrease when a preceding object is detected can be set differently depending on each level.

For example, Table 1 below shows a distance to a preceding object at which deceleration control can start when the object is detected in front of a vehicle for which a target speed is set to 30 kph, and a distance to the object at which the vehicle speed can be reduced to 0 kph to brake the vehicle and deceleration control ends.

TABLE 1

|  | Level 4 | Level 3 | Level 2 | Level 1 |
|---|---|---|---|---|
| Distance to preceding object at which deceleration control starts | 57.1 m | 53.8 m | 47 m | 38.5 m |
| Distance to preceding object at which deceleration control ends | 3.2 m | 3.1 m | 3 m | 2.7 m |

Referring to Table 1, the vehicle can perform deceleration control from when the distance to the preceding object is within 57.1 m to when the distance to the preceding object is within 3.2 m at level 4, and set a shorter distance to the preceding object at which deceleration control starts and a shorter distance to the preceding object at which deceleration control ends depending on each level at levels 3, 2, and 1, for example.

However, this example does not take a snowy or rainy situation on roads into account. In a snowy or rainy situation on roads, the distance to the preceding object at which deceleration control starts and the distance to the preceding object at which deceleration control ends may be set to be longer as compared to Table 1 above.

Figure 5:
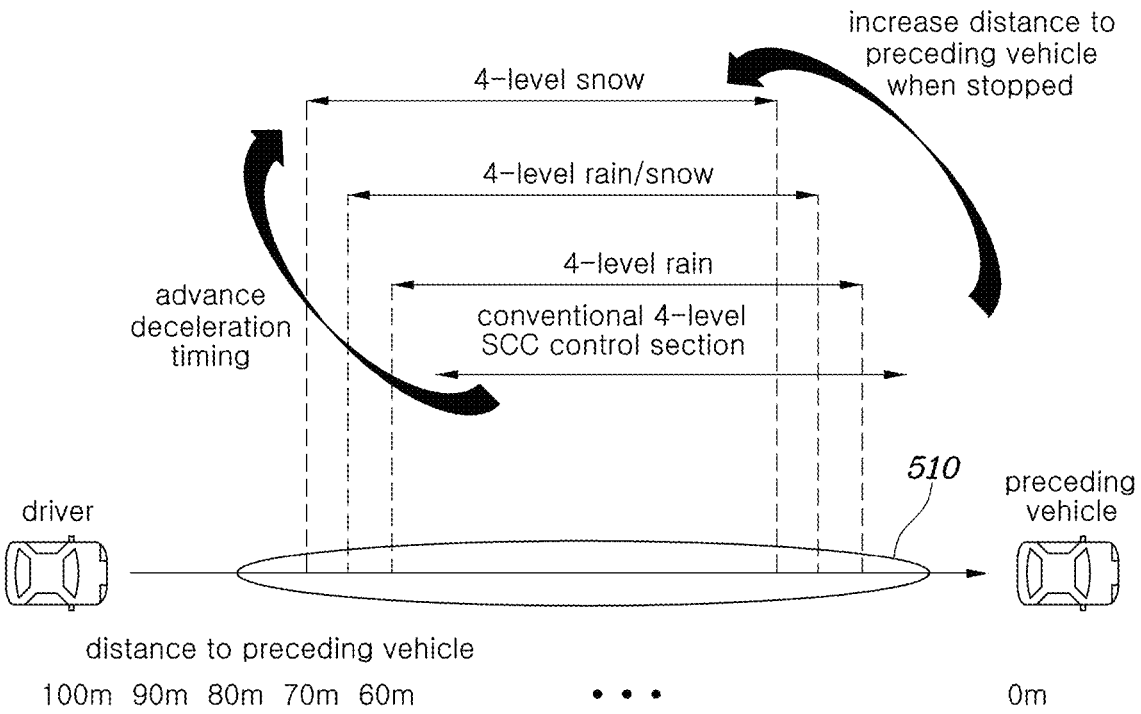
FIG. 5 is a diagram showing an example in which a deceleration timing and a braking distance of a vehicle are advanced as a preceding vehicle approaches based on weather information according to an embodiment of the present disclosure.

For example, referring to FIG. 5, deceleration control starts when the distance 510 to a preceding vehicle is within 57.1 m and deceleration control ends when the distance is 3.2 m in the conventional 4-level smart cruise control (SCC) sections. However, according to an embodiment of the present disclosure, in a situation where rain is falling on the road on which the vehicle is traveling, the distance at which deceleration control starts and the distance at which deceleration control ends can be extended such that the deceleration timing is advanced compared to that in a situation without snow or rain in consideration of wheel slip.

In a situation where both snow and rain are falling on the road on which the vehicle is traveling, the distance at which deceleration control starts and the distance at which deceleration control ends can be further extended such that the deceleration timing is advanced compared to that in a rainy situation.

In a situation where there is snow on the road on which the vehicle is traveling, the distance at which deceleration control starts and the distance at which deceleration control ends can be further extended such that the deceleration timing is advanced compared to that in a situation where snow and rain are falling together.

A specific control start time and end time may be determined by test values according to a target vehicle speed and the distance to the preceding vehicle.

Figure 6:
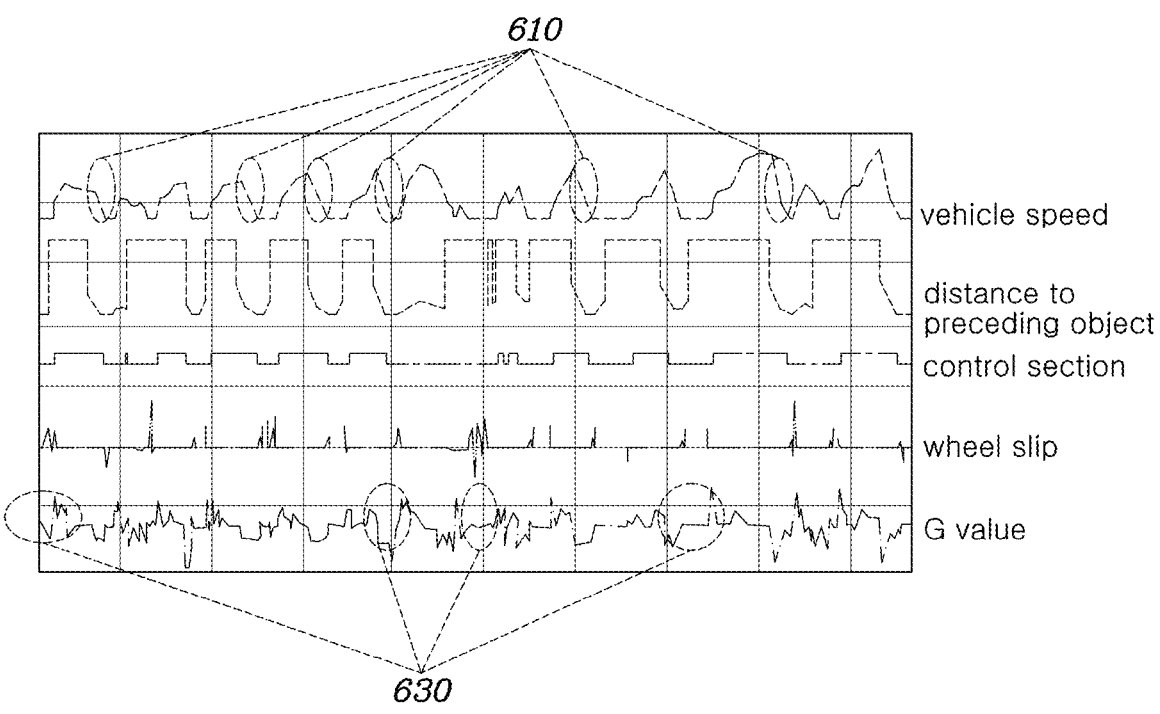
FIG. 6 is a chart showing an example of sections in which wheel slip is likely to occur in a vehicle to which general autonomous driving assistance technology is applied, according to an embodiment of the present disclosure.

FIG. 6 shows an example of sections where wheel slip is likely to occur in a vehicle to which general autonomous driving assistance technology can be applied.

Referring to FIG. 6, it can be ascertained that, in a vehicle to which general autonomous driving assistance technology is applied, wheel slip can occur at a timing 610 at which the vehicle speed suddenly decreases and a timing 630 at which a G value significantly changes, that is, the timing 630 at which acceleration significantly changes. In particular, it can be necessary to set a rising limit for limiting acceleration in sections where sudden acceleration is performed and to set a falling limit for limiting deceleration in sections where sudden braking is performed.

Figure 7:
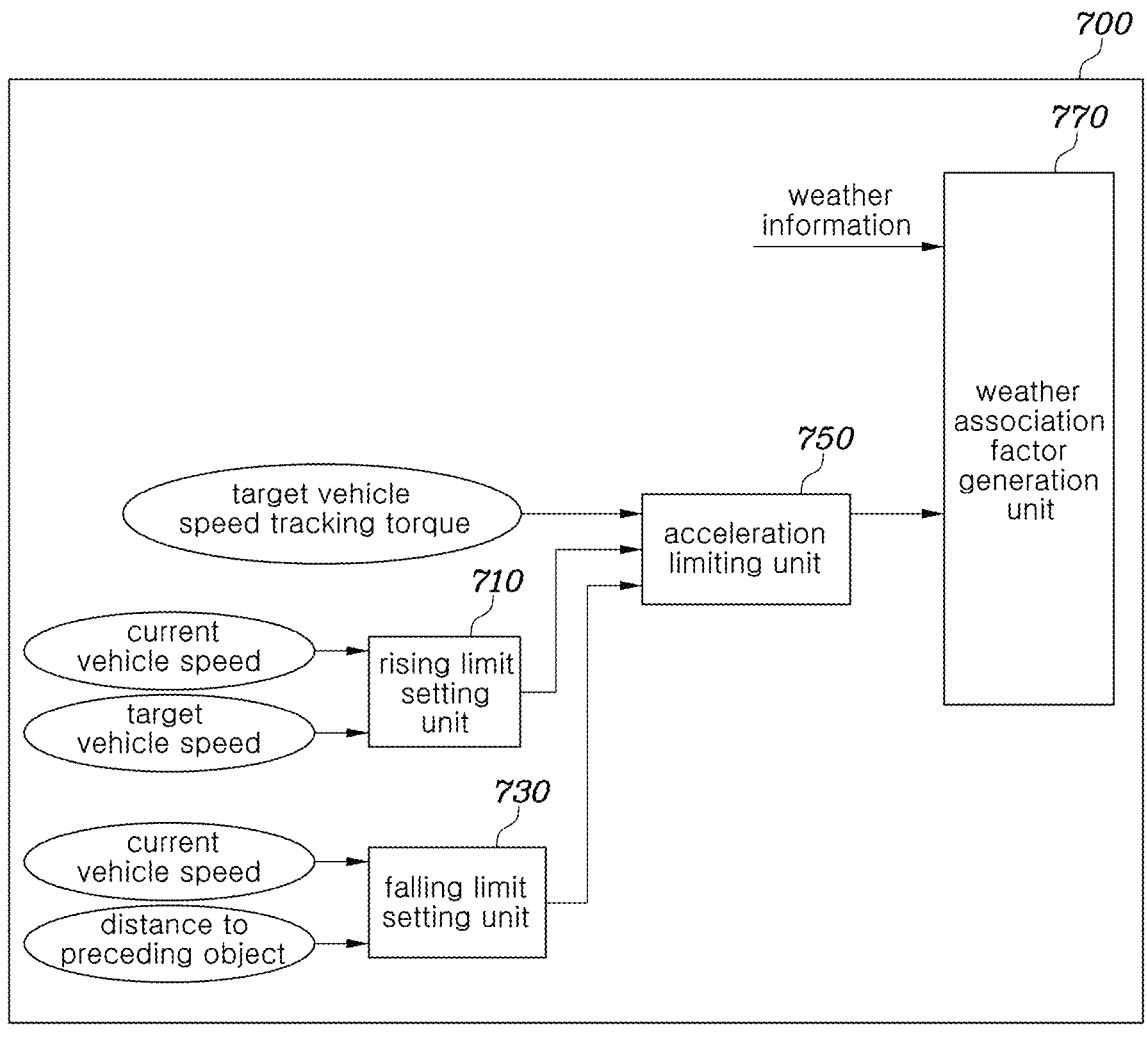
FIG. 7 is a block diagram showing a structure of a weather information association unit according to an embodiment of the present disclosure.

FIG. 7 is a block diagram showing a detailed structure of a weather information association unit according to an embodiment of the present disclosure.

Referring to FIG. 7, a weather information association unit 700 can include a rising limit setting unit 710, a falling limit setting unit 730, an acceleration limiting unit 750, and a weather association factor generating unit 770, any combination of or all of which may be in plural or may include plural components thereof.

The rising limit setting unit 710 can determine a rising limit, which can be an upper limit for acceleration, based on the current vehicle speed and a target vehicle speed.

The rising limit setting unit 710 may determine a lower rising limit as the difference between the current vehicle speed and the target vehicle speed increases.

The falling limit setting unit 730 can determine a falling limit, which can be a lower limit for acceleration, based on the current vehicle speed and a distance to a preceding object.

The falling limit setting unit 730 may determine a higher falling limit as a braking distance or a distance to a preceding object decreases.

The acceleration limiting unit 750 can determine a limited acceleration of the vehicle based on a target vehicle speed tracking torque, a rising limit, and a falling limit.

The target vehicle speed tracking torque may not be a required torque based on an accelerator pedal operation amount (APS value) input by the driver but may be a required torque determined by a predetermined controller to satisfy the target vehicle speed. For example, the target vehicle speed tracking torque may be an SCC torque, and the SCC torque may be determined based on the current vehicle speed, the speed of the preceding vehicle, and the distance to the preceding vehicle, for example.

The weather association factor generation unit 770 can generate weather association factors based on weather information and the limited acceleration of the vehicle received from the acceleration limiting unit 750.

The weather information may be received by the information acquisition unit 210, and specifically, may be received by the communication unit 211 or the sensor unit 215.

The weather information may include at least one of whether rain or snow is falling, rainfall amount information, precipitation information, or a combination thereof. For example, different values may be received as weather information depending on presence or absence of precipitation or snowfall, for example, a value of "0" may be received in a situation where there is no snow or rain, a value of "1" may be received in a situation where rain is falling, a value of "2" may be received in a situation where rain and snow are falling, and a value of "3" may be received in a situation where snow is falling.

Referring back to FIG. 2, a wheel slip information association unit 233 can determine a correction factor according to wheel slip based on wheel slip rate and steering angle compensation.

Figure 8:
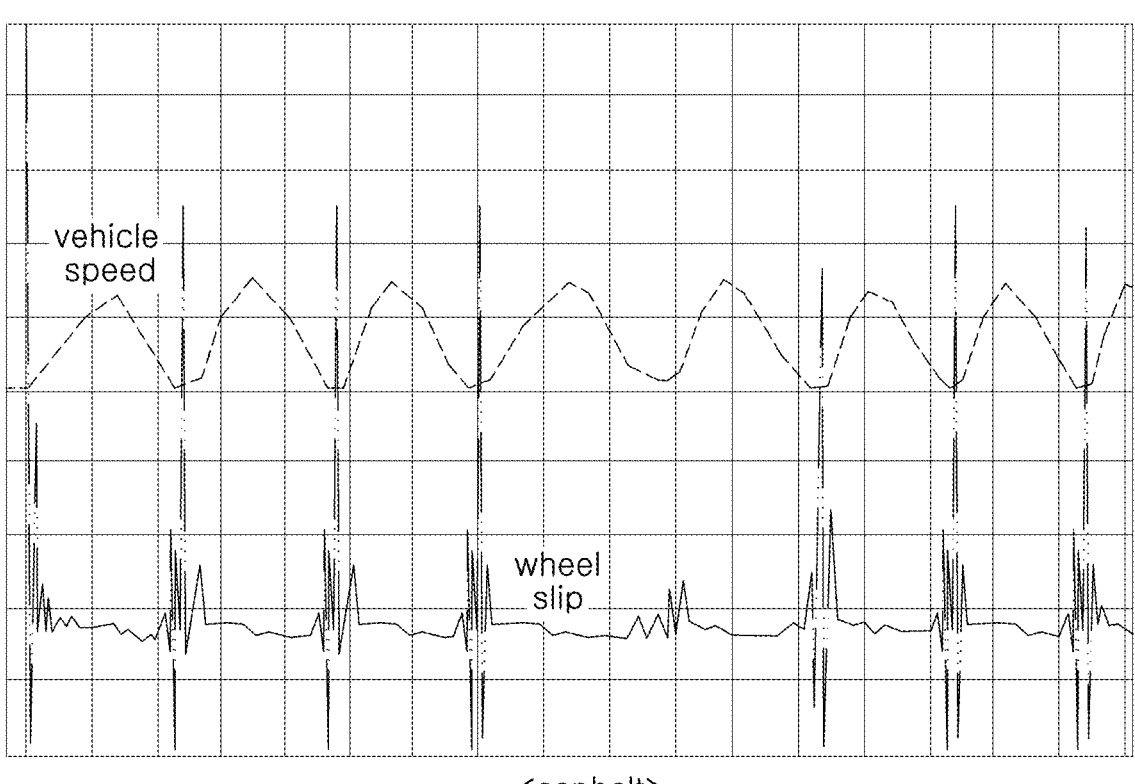
FIG. 8 is a chart showing changes in a wheel slip rate according to changes in a vehicle speed when a general vehicle travels on an asphalt road in an environment without snow or rain.
Figure 9:
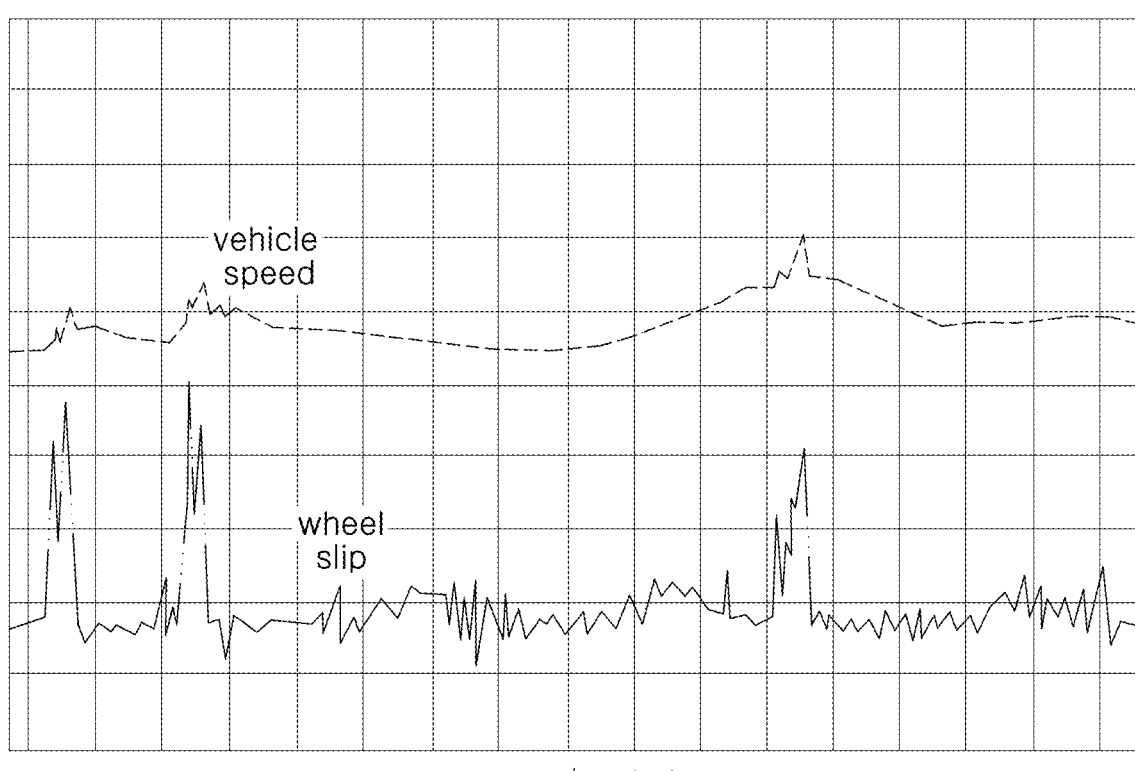
FIG. 9 is a chart showing changes in a wheel slip rate according to changes in a vehicle speed when a general vehicle travels on an asphalt road in a snowy environment.
Figure 10:
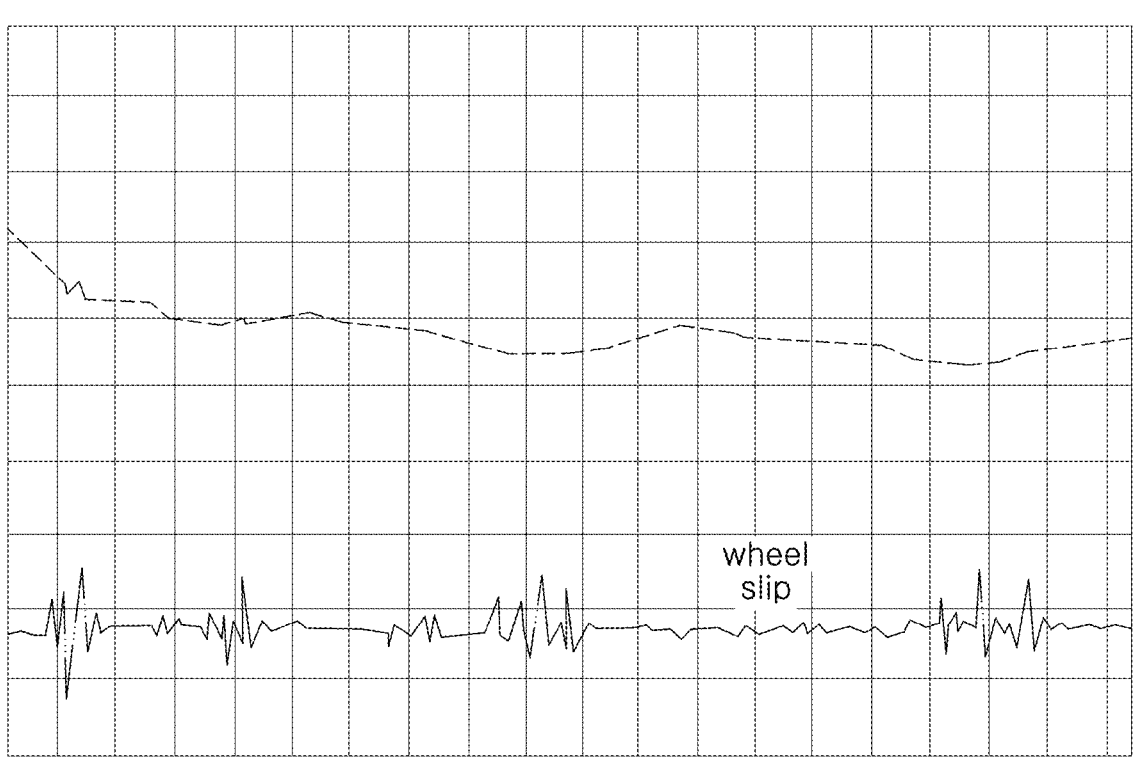
FIG. 10 is a chart showing changes in a wheel slip rate according to changes in a vehicle speed when a general vehicle travels on an asphalt road in a rainy environment.

FIGS. 8 to 10 show changes in a wheel slip rate according to changes in a vehicle speed when a general vehicle travels on an asphalt road in an environment in which there is no snow or rain, in an environment in which snow is falling, and in an environment in which rain is falling.

FIG. 8 shows changes in a wheel slip rate according to changes in the vehicle speed when a general vehicle travels on an asphalt road in an environment in which there is no snow or rain. FIG. 9 shows changes in the wheel slip rate according to changes in the vehicle speed when the general vehicle travels on an asphalt road in a snowy environment. FIG. 10 shows changes in the wheel slip rate according to changes in the vehicle speed when the general vehicle travels on an asphalt road in a rainy environment.

Referring to FIGS. 8 to 10, it can be ascertained that a general vehicle has different slip rates when traveling on an asphalt road in an environment in which there is no snow or rain, in an environment in which snow is falling, and in an environment in which rain is falling.

Wheel slip can frequently occur in a section where the vehicle speed is about 5 kph when the vehicle resumes traveling after stopping and in a section before stopping. Therefore, for effectiveness, correction according to wheel slip may be set not to be used in these sections.

Figure 11:
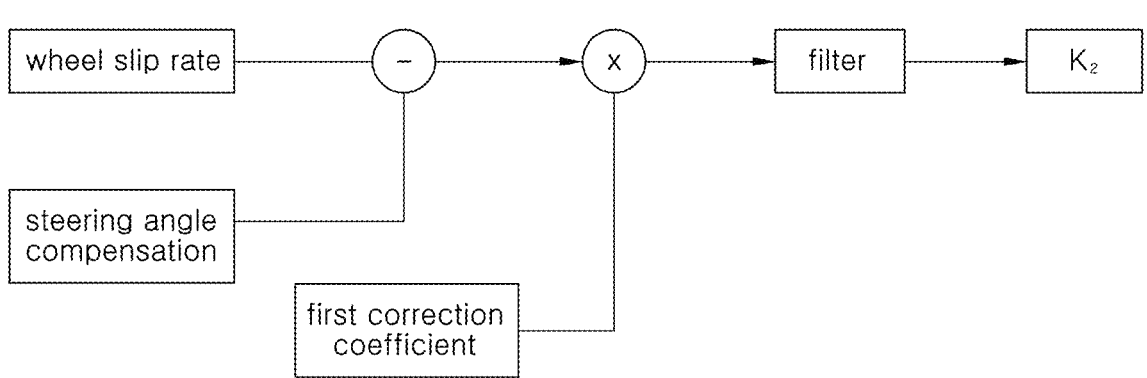
FIG. 11 is a diagram showing an example of a control diagram showing a method of determining a factor according to wheel slip based on a wheel slip rate and steering angle compensation in a wheel slip information association unit, according to an embodiment of the present disclosure.

FIG. 11 shows an example of a control diagram showing a method of determining a factor according to wheel slip based on a wheel slip rate and steering angle compensation in the wheel slip information association unit according to an embodiment of the present disclosure.

Referring to FIG. 11, it can be ascertained that the factor $K_2$ according to wheel slip can be determined by mathematical expression 1 below.

[Mathematical expression 1]

Factor according to wheel slip $(K_2)$ = first correction coefficient $\times$ (wheel slip rate – steering angle compensation)

In mathematical expression 1, the wheel slip rate is a value determined by the ratio of a front wheel speed to a rear wheel speed, and the steering angle compensation represents a wheel slip correction coefficient according to steering. Additionally, the first correction coefficient can be determined by mathematical expression 2 below.

[Mathematical expression 2]

First correction coefficient = (wheel slip torque)/

(target vehicle speed tracking torque) × second correction coefficient

In mathematical expression 2, the target vehicle speed tracking torque is not a required torque based on an accelerator pedal operation amount (APS value) input by the driver, but is a required torque determined by a predetermined controller to satisfy a target vehicle speed. For example, the target vehicle speed tracking torque may be an SCC torque, and the SCC torque may be determined based on the current vehicle speed, the speed of a preceding vehicle, and the distance to the preceding vehicle, for example. Additionally, the wheel slip torque represents a torque that reflects a torque loss due to wheel slip in the overall torque of the vehicle. Additionally, the second correction coefficient is a coefficient for correcting the first correction coefficient based on the wheel slip torque and the target vehicle speed tracking torque.

In mathematical expression 1, the wheel slip rate can be determined by mathematical expression 3 below.

[Mathematical expression 3]

Wheel slip rate =

(front wheel speed − rear wheel speed)/(front wheel speed)

The factor according to wheel slip determined using mathematical expression 1 may be determined by performing filtering for noise removal on a value obtained by multiplying the first correction coefficient by the difference between the wheel slip rate and steering angle compensation.

Referring back to FIG. 2, a driving source control unit 235 can determine a driving torque factor based on the weather association factor determined by the weather information association unit 231 and the correction factor according to wheel slip determined by the wheel slip information association unit 233 and can control the driving source 250 of the vehicle based on the driving torque factor.

The driving source control unit 235 can control the driving source 250 by transmitting a command torque to the driving source 250.

The command torque may be determined based on the driving torque factor.

The driving torque factor $TQ_1$ can be determined by mathematical expression 4 below.

$$TQ_1 = TQ_2 \times K_1 - K_2 \qquad \text{[Mathematical expression 4]}$$

In mathematical expression 4, $TQ_1$ represents a final torque factor in which weather information and road environment information according to the present disclosure have been reflected, $TQ_2$ represents the target vehicle speed tracking torque, $K_1$ represents the weather association factor, and $K_2$ represents the correction factor according to wheel slip.

The target vehicle speed tracking torque may not be a required torque based on an accelerator pedal operation amount (APS value) input by the driver, but may be a required torque determined by a predetermined controller to satisfy the target vehicle speed. For example, the target vehicle speed tracking torque may be an SCC torque, and the SCC torque may be determined based on the current vehicle speed, the speed of a preceding vehicle, and the distance to the preceding vehicle, for example.

The driving source 250 can receive the command torque from the driving source control unit 235 and move the vehicle forward or backward based on the command torque.

The driving source of the vehicle may be an engine or a motor.

Figure 12:
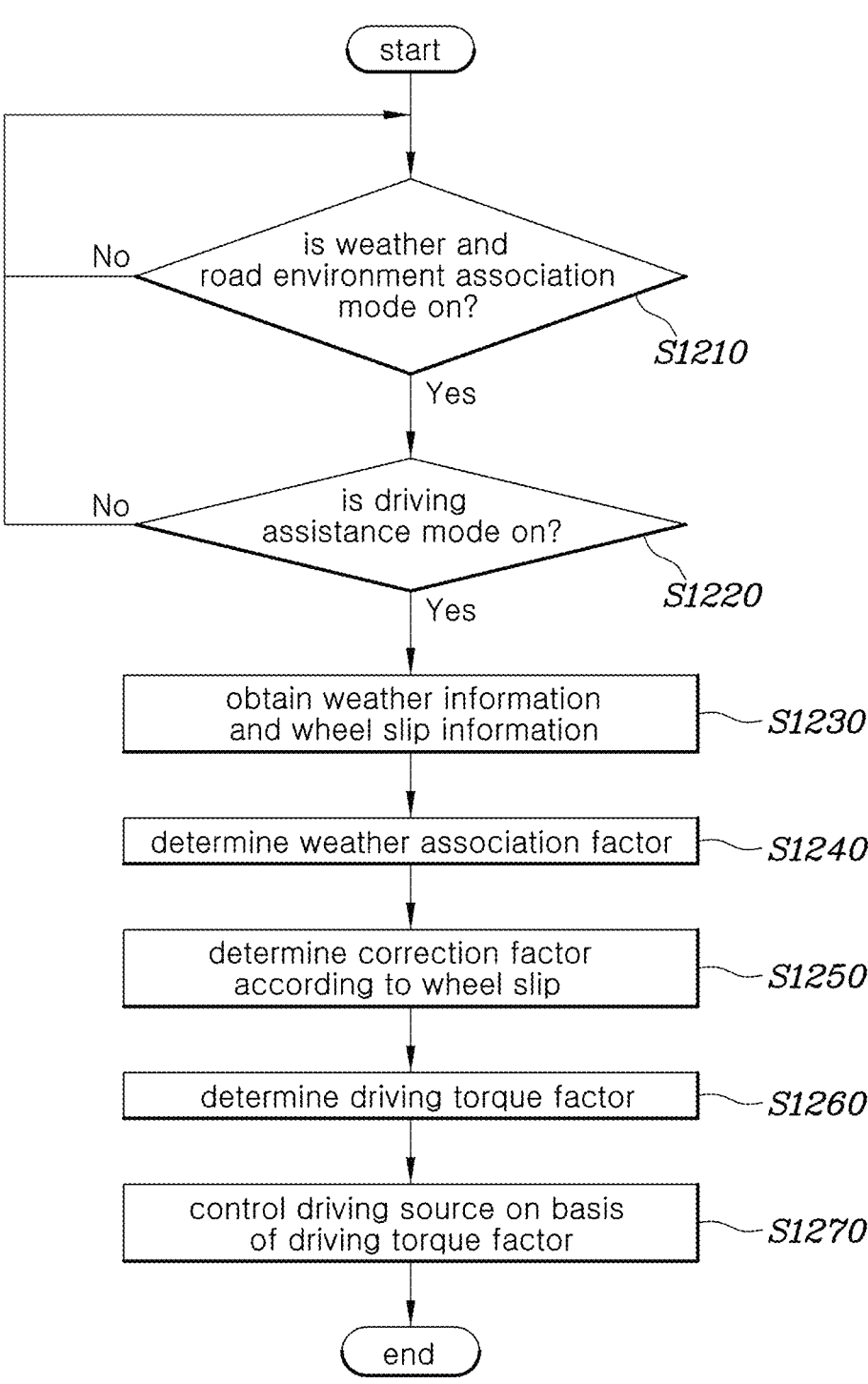
FIG. 12 is a flowchart showing a vehicle control method according to an embodiment of the present disclosure.

FIG. 12 is a flowchart showing a vehicle control method according to an embodiment of the present disclosure.

The vehicle control method according to the present embodiment can be performed by the vehicle control system of the embodiment of FIG. 2.

Referring to FIG. 12, the vehicle control system can determine whether the weather and road environment association mode is ON (operation S1210).

Information on the weather and road environment association mode can be obtained by receiving user input from the driver through an input/output interface installed in the driver's seat of the vehicle.

The input/output interface may be an AVN system.

The vehicle control system can determine whether the driving assistance mode is ON (operation S1220).

The driving assistance mode may be preset in a memory, a storage device, or the like, of the vehicle control system to be activated or deactivated.

The vehicle control system can obtain weather and wheel slip information (operation S1230).

The weather information may be received from a weather server or obtained by a camera or a LiDAR sensor installed in the vehicle.

The wheel slip information may be determined based on the front wheel speed and rear wheel speed.

The vehicle control system can determine a weather association factor (operation S1240).

The weather association factor may be determined based on weather information, a target vehicle speed tracking torque, a rising limit, and a falling limit.

The target vehicle speed tracking torque may not be a required torque based on an accelerator pedal operation amount (APS value) input by the driver, but may be a required torque determined by a predetermined controller to satisfy the target vehicle speed. For example, the target vehicle speed tracking torque may be an SCC torque, and the SCC torque may be determined based on the current vehicle speed, the speed of a preceding vehicle, and the distance to the preceding vehicle, for example.

The weather association factor may be determined by the weather information association unit 700 shown in FIG. 7.

The vehicle control system can determine a correction factor according to wheel slip (operation S1250).

The correction factor according to wheel slip may be determined based on the first correction coefficient, a wheel slip rate, and steering angle compensation.

The first correction coefficient may be determined using mathematical expression 2 based on the target vehicle speed tracking torque, a wheel slip torque, and the second correction coefficient.

The wheel slip rate can be determined using mathematical expression 3 based on the front wheel speed and rear wheel speed.

The vehicle control system can determine a driving torque factor based on the weather association factor and the correction factor according to wheel slip (operation S1260).

The driving torque factor can be determined using mathematical expression 4.

Additionally, the vehicle control system can control the driving source of the vehicle based on the driving torque factor determined in operation S1260 (operation S1270).

Vehicle control can be performed by transmitting a command torque to the driving source of the vehicle.

The driving source of the vehicle may be an engine or a motor.

According to some embodiments of the present disclosure (e.g., as described above by examples), driver safety can be secured depending on weather changes and driving roads.

By implementing an embodiment of the present disclosure, driving safety can be expanded by determining not only a weather environment but also a road environment as factors with respect to wheel slip of a vehicle and varying driving performance.

By implementing an embodiment of the present disclosure, simply received primary weather information can be calculated into a more reliable factor through vehicle status information, and even if weather information is not received or inaccurate information is received, reliability of driving safety can be secured according to vehicle status information.

By implementing an embodiment of the present disclosure, vehicle control technology that can be flexibly applied not only to smart regenerative braking but also to various types of autonomous driving cooperative control can be provided.

What is claimed is:

1. A method of controlling a vehicle, comprising:
obtaining weather information and wheel slip information for the vehicle;
determining a weather association factor based on the weather information;
determining a wheel slip correction factor based on the wheel slip information;
determining a driving torque factor based on the weather association factor and the wheel slip correction factor; and
controlling a driving source of the vehicle based on the driving torque factor,
wherein determining the driving torque factor includes subtracting the wheel slip correction factor from a value obtained by multiplying a target vehicle speed tracking torque by the weather association factor.

2. The method of claim 1, wherein the weather information is obtained from a weather server or from being detected by at least one sensor installed in the vehicle.

3. The method of claim 2, wherein the at least one sensor includes at least one of or any combination of a camera, a radar, a light detecting and ranging device (LiDAR), a temperature sensor, and a humidity sensor.

4. The method of claim 1, wherein the wheel slip information is determined based on a front wheel speed and a rear wheel speed.

5. The method of claim 1, wherein the weather information includes one of or any combination of rainfall amount information, precipitation information, and whether rain or snow is falling.

6. The method of claim 1, wherein determining the weather association factor is based on the weather information, the target vehicle speed tracking torque, a rising limit, and a falling limit.

7. The method of claim 6, wherein the rising limit is an upper limit for acceleration determined based on a current vehicle speed and the target vehicle speed.

8. The method of claim 6, wherein the falling limit is a lower limit for acceleration determined based on a braking distance of the vehicle or a distance from the vehicle to a preceding object.

9. The method of claim 1, wherein determining the wheel slip correction factor is based on the target vehicle speed tracking torque, a wheel slip torque, a wheel slip rate, and steering angle compensation.

10. A system for controlling a vehicle, the system comprising:
an information acquisition unit configured to:
obtain weather information and wheel slip information relating to the vehicle and a road on which the vehicle is traveling in response to a weather and road environment association mode being in an ON state;
a driving source; and
a controller configured to:
determine a weather association factor based on the weather information;
determine a wheel slip correction factor based on the wheel slip information;
determine a driving torque factor based on the weather association factor and the wheel slip correction factor; and
control the driving source of the vehicle based on the driving torque factor, wherein:
the driving source is configured to move the vehicle forward under the control of the controller, and
the driving torque factor is determined by subtracting the wheel slip correction factor from a value obtained by multiplying a target vehicle speed tracking torque by the weather association factor.

11. The system of claim 10, wherein the weather information is received from a weather server or detected by at least one sensor installed in the vehicle.

12. The system of claim 10, wherein the wheel slip information is determined based on a front wheel speed and a rear wheel speed.

13. The system of claim 10, wherein the weather information includes one of or any combination of whether rain or snow is falling, rainfall amount information, and precipitation information.

14. The system of claim 10, wherein the weather association factor is determined based on the weather information, the target vehicle speed tracking torque, a rising limit, and a falling limit.

15. The system of claim 14, wherein the rising limit is determined based on a current vehicle speed and the target vehicle speed.

16. The system of claim 14, wherein the falling limit is determined based on a braking distance of the vehicle or a distance from the vehicle to a preceding object.

17. The system of claim 10, wherein the wheel slip correction factor is determined based on the target vehicle speed tracking torque, a wheel slip torque, a wheel slip rate, and steering angle compensation.

18. The system of claim 11, wherein the at least one sensor includes at least one of or any combination of a camera, a radar, a light detecting and ranging device (Li-DAR), a temperature sensor, and a humidity sensor.

\* \* \* \* \*